Aug. 17, 1965

C. O. SCOTT 3,201,169

SAFETY DOOR FOR VEHICLES

Filed July 12, 1963

INVENTOR.
CLIFFORD O. SCOTT
BY Joseph A. Hill
ATTORNEY

Aug. 17, 1965　　　　　C. O. SCOTT　　　　　3,201,169
SAFETY DOOR FOR VEHICLES
Filed July 12, 1963　　　　　　　　　　　　　　　2 Sheets-Sheet 2

INVENTOR.
CLIFFORD O. SCOTT
BY *Joseph A. Hill*

ATTORNEY

United States Patent Office 3,201,169
Patented Aug. 17, 1965

3,201,169
SAFETY DOOR FOR VEHICLES
Clifford O. Scott, 4015 Kittyhawk Drive, Dayton, Ohio
Filed July 12, 1963, Ser. No. 294,771
7 Claims. (Cl. 296—44)
(Granted under Title 35, U.S. Code (1952), sec. 266)

The invention described herein may be manufactured and used by or for the Government for governmental purposes without the payment to me of any royalty thereon.

The present invention relates to improvements in body construction for vehicles and is particularly directed to a novel door for aircraft fuselage bodies and means for operating the door, which with modifications is adaptable for trucks, tractors and buses. This is an improvement on and a new adaptation of Patent No. 2,658,792, dated Nov. 10, 1953.

At the present time the entrance and exit openings for vehicles and especially small conventional aircraft and helicopters are closed by hinged doors that cannot be opened in flight and that are very hard to open while parked with the engine running, due to the tendency of the airstream to hold the door closed. Under current design many aircraft cannot open windows for ventilation, taking of pictures, etc.

It is therefore an object of this invention to provide an improved method of body construction for increased safety and faster and easier entrance and exit of the cabin through provision of a door structure comprising a lower housing portion and an upper window portion that is retractable into the lower portion, said retracted door portions being movable within the confines of the body into a space adjacent the door opening whereby said door may be maneuvered from closed to open positions and vice versa.

Another object of the invention is to provide in an aircraft body having the foregoing characteristics a single manually operable mechanism for actuating the movable parts of the structure, said mechanism having a manipulating device which is accessible either interiorly or exteriorly of the body.

Another object is to provide an aircraft body with a suitable compartment of space disposed within the confines of the body to one side of the door opening therefor, and arranged to house the lower portion only of the door whenever one desires to enter or leave the body.

Another objective is to provide means for jettisoning or ejection of the complete door assembly manually from the aircraft body in case of an impending disaster, such as fire or collision and automatically for easier exit or access to the enclosed personnel in case of an actual fire, collision or other disaster.

A further object is to provide a door actuating means that upon institution of a door opening operation acts to move one of the door sections into enclosed relation with the other section and thereafter moves both sections into the compartment provided therefor, said means including a mechanism that functions to return the retracted door portion to a preselected extended position upon return of the door to closed position.

Another object of the invention is to provide in the aircraft body a door which is maneuverable into a space between the inner and outer skin of the body and includes the provision of a door opening mechanism associated with a window retracting means which initiates window retracting movement into the door prior to moving the retracted door structure into the said space.

The accomplishment of these objectives will be conducive to greater comfort and safety and the prevention of accidents, easier entrance and exit, reduction in manufacturing costs and investment in special tools, dies, and the like.

All of these objects and advantages will be apparent from the following specification and the accompanying drawings in which.

Figure 1:
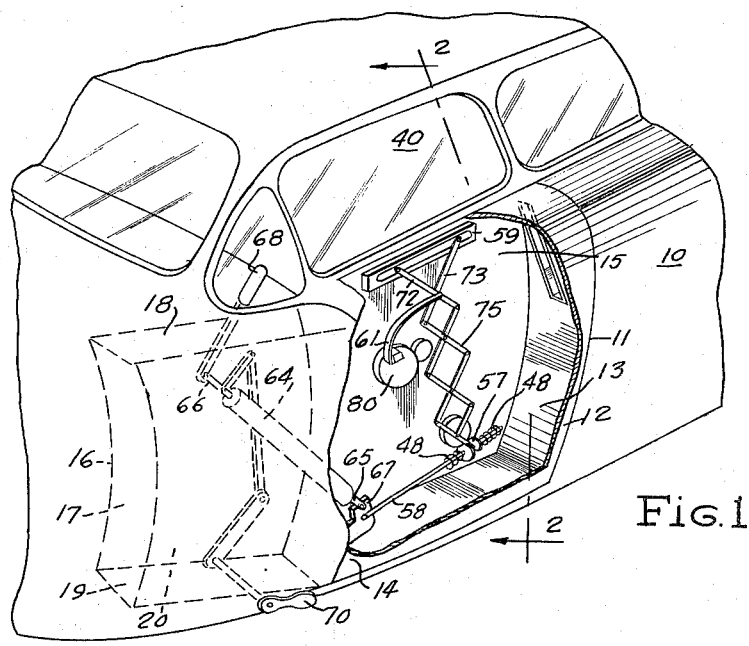
FIG. 1 is a fragmental, perspective view of a closed aircraft fuselage body which is illustrative of the features and functions of my invention, and wherein some parts are broken away.

In the drawings the numeral 10 generally indicates a closed aircraft body embodying the features of the conventional fuselage. In this respect it will be noted with reference to FIG. 1 that the passenger compartment is rearwardly of the cowl and that the doors for the compartment have lower portions wholly located beneath the tops of the cowl for the body and adapted to receive upper window portions which extend into the head space for the body. The closed body may have one or more openings 11 therein for entrance into and for leaving its interior. As illustrated in the drawings and especially in FIG. 1 the opening is in the forward portion of the body side wall adjacent the pilot's seat and the lower portion of the opening 11 is normally closed by a hollow door generally indicated by the reference numeral 12. The door is constructed with the usual rectangular frame 13 to which is secured an exterior door panel 14 and an interior panel 15.

The door is mounted for sliding movement into the body of the fuselage preferably beneath and behind the outer cowl. To this end a rectangular chamber or recess 16 is disposed adjacent the door opening 11 and consists of a front wall 17, top wall 18, bottom wall 19, outside wall 20 and an inside wall 21. It will be noted that the compartment therefore has an open side adjacent the body opening 11 to permit forward movement of the door 12 from its closed position to an inoperative, door opened position within the compartment, and that the chamber extends into the body 10 of the vehicle at an angle with the door opening so that said door may be stored within the contour of the body.

Figure 4A:
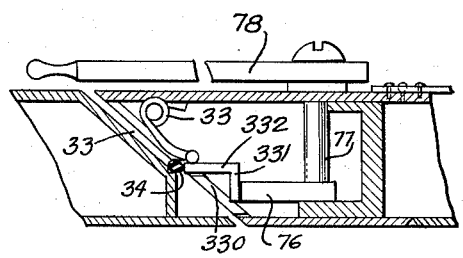
FIG. 4a is an enlarged view of the door jettisoning feature of FIG. 4.
Figure 4:
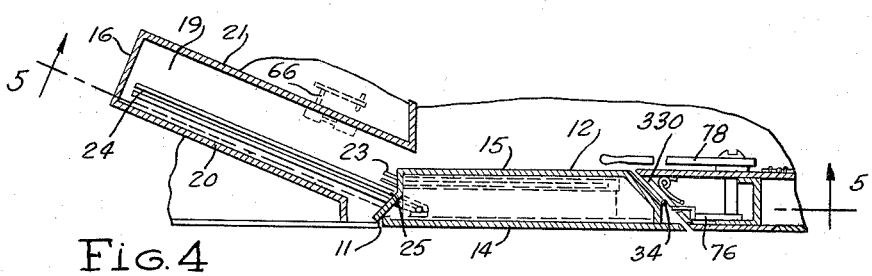
FIG. 4 is a section taken on line 4—4 of FIG. 2.
Figure 6:
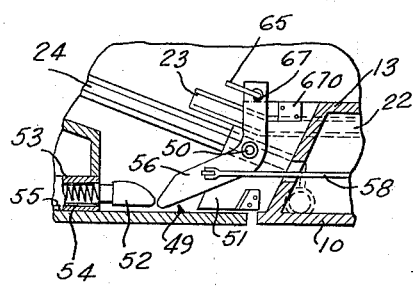
FIG. 6 is a detail of the latch and door guide mechanism of the invention.
Figure 7:
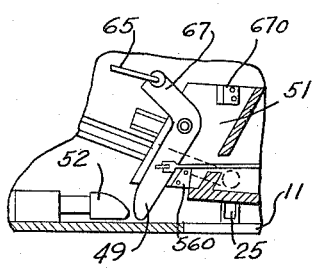
FIG. 7 is a similar view of the door latch showing it in another operative position.

Guide rails 22 extend along the interior of the bottom of the door opening 11 and have their end portions 23 disposed at a slight angle to the main portion and extend a short distance into the compartment 16 (FIGS. 4, 6 and 7). Guide rails 24 extend along the exterior side of the compartment bottom wall 19 and have their end portions 25 extending into the adjacent side of the body opening. As illustrated in FIGS. 4, 6 and 7, the portion 25 is directed outwardly and substantially transversely of the door opening for the purposes to be hereinafter described.

Figure 3:
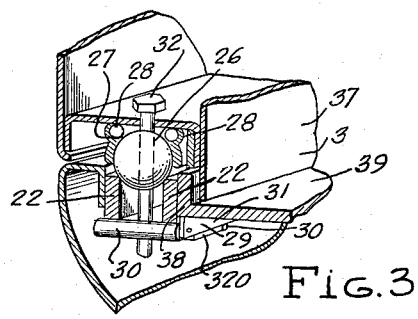
FIG. 3 is a sectional detail shown partly in perspective and illustrating the guide means for the sliding door of this invention.
Figure 5:
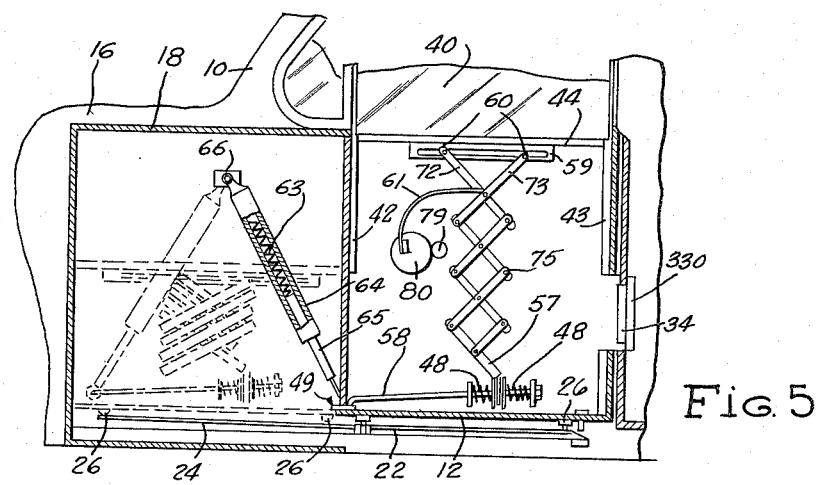
FIG. 5 is a cross section taken on line 5—5 of FIG. 4.

In FIG. 3 there is shown a ball type roller 26 which is rotatably mounted in a suitable bearing 27 fixed to the underside of the bottom frame member for the door, said ball being freely movable in the bearing by means of a circular row of antifriction ball bearings 28 interposed between the surface of the ball and said frame member. As illustrated in FIGS. 4 and 5, one roller 26 is guided in rails 22 whilst a similarly constructed roller 26 is engaged in guide rails 24. The door is held in upright position during its sliding movement by means of a roller truck 29 positioned adjacent each roller 26. The truck comprises a pair of rollers 30 carried in a frame 31 which is secured to the door by a bolt 32 that passes through the lower member of the door frame 13, between the set of rails 22 and through a cross member 320 of the frame 31 and has threaded to its end a retaining nut. With reference to FIGS. 4 and 5 the door is aligned within the openings by a V-shaped slot formed in one side of a swinging hinged panel 330 mounted on the rear door post. Door 12 is held in a closed position by cam lever 76 mounted in the lower portion of the body opening which receives an elongated rod 34 welded or otherwise fastened vertically to the door frame. The door has the usual weather sealing strips between it and the door opening and as illustrated in FIG. 3 the bottom edge of the door is sealed by a strip 37 which overhangs an upturned flange 38 formed along the edge of the floor 39 of the vehicle body.

FIG. 4a is a top view of the rear edge of the door assembly showing how the door can be jettisoned manually or by the force of a collision. The rear edge of door 12 is at a 45° angle to the face of the door, said rear edge having a semi-circular recess vertically and near the center of the door edge. This recess has a short piece of rod 34 welded in it. As the door slides shut against the door post 330, the rod 34 will mate with a similar recess within the edge of the door post and alignment of the door to the door post will be accomplished. Door 12 can be easily jettisoned manually because the edge of door post 330 is hinged by hinge spring 33 to swing back away from the door thereby allowing the door to swing outward and to the rear away from the aircraft. When the door is operating in normal condition the hinged edge of the door post will be closed forming a stop and alignment means for the horizontally sliding door 12. The hinged edge panel of the door post has a frangible member 332 which will break upon collision of the aircraft but is sufficiently strong at the break joint 331 to withstand the jar from opening and closing of the sliding door. To keep the hinged edge panel of the door post closed, a cam 76 is provided which is moved through shaft 77 and handle 78. When the door is to be jettisoned manually, lever 78 is pulled thereby removing the cam 76 from member 33. Upon rotation of cam 76 the panel 330 will be hinged toward the rear and door 12 will move to the rear and out away from the plane.

Door 12 will also automatically be jettisoned upon collision because of the rearward force on door 12 caused by the collision. This force will act through rod 34 which is in alignment with the one member forming the frangible joint 331. As joint 331 breaks panel 330 will swing to the rear and door 12 will be jettisoned. Because of frangible joint 331, the door 12 will be jettisoned without having to move lever 78 and cam 76. With the cam 76 and the frangible joint 331, the door can be either manually or automatically jettisoned.

As will be more fully set forth hereinafter a means for maneuvering the door and window structure from closed to open position and vice versa, may be of any suitable character but I prefer to employ an actuating device which in this instance is shown as comprising a rotatable shaft 66 mounted on the inside wall 21 which has secured thereto a hand operated lever 68 disposed in the vicinity of the left-hand corners of the instrument board 69 (FIG. 2) and also a spring-loaded extensible arm 63 which comprises an outer tubular section 64 and a telescopic section 65 which at its lower extremity is pivotally connected to an arm 67 of a bell-crank lever and latch 49.

As has been stated the sliding door 12 is adapted to close the lower portion of the body opening whilst a suitable window 40 is adapted to selectively close all or part of the body opening above the door. The window is mounted within the door for relative sliding movement therefrom into the upper portion of the body opening. To this end the sides of the window are slidably mounted in spaced channel members 42–43 (FIG. 5) fixed to the vertical members of the door frame 13 and the window is supported on a flat slotted strip 59 attached to channel 44 at the base of the transparent portion of window 40. Pins 60 mounted in upper ends of lattice strips 72 and 73 of window lift 75 move horizontally in strip 59 when opening or closing the window 40.

The actuating device for maneuvering the door includes a door latch which is best illustrated in FIGS. 6 and 7 and comprises a bell-crank lever 49 pivotally mounted at 50 to an extension 51 disposed near the bottom of the door. The lever engages a spring pressed keeper 52 which is mounted for longitudinal movement in a bore 54 of a block 53, the latter being secured to the fuselage body 10 by bolts 55. The outer camming arm 56 of the bell-crank lever 49 is connected to a pivoted quick acting link 58 for automatic operation of the window. Link 58 is held in suspension by two coiled springs 48 to allow manual operation of window 40 when door 12 is in closed position through rotation of gears 79 and 80 by handle 47 in FIG. 2 for selective opening of window 40 by rotation of spring arm 61 attached to gear 80.

The movement of the door is manually controlled by a spring loaded, extensible arm 63 which comprises an outer tubular member 64 and a telescopic section 65 which are respectively connected to a rotatable shaft 66 mounted on the inside wall 21 and an inwardly extending arm 67 of the bell-crank 49 for the latch. With reference to FIG. 6, it will be noted that the normal door retaining position of the bell-crank is established by a stop 670 which is shown as a bracket secured to extension 51 of the door rearwardly of the arm 67 of the bell-crank. As has been stated he telescopic, spring loaded arm sets up a clockwise force in the bell-crank (FIG. 6) when the door is in closed position or is being moved to said position, and contact of the bell-crank with the stop 670 positively secures the crank in its door closed position, so that the bell-crank lever 49 may cooperate with keeper 52 in latching the door.

Figure 2:
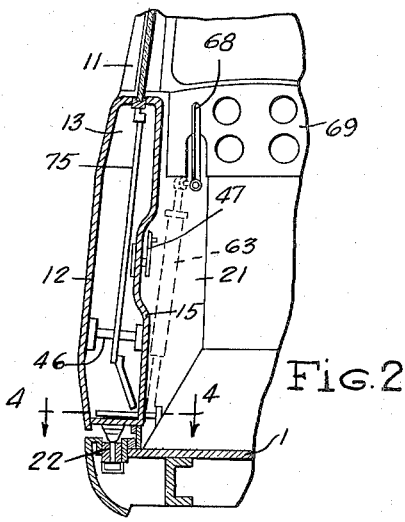
FIG. 2 is an enlarged cross sectional view taken on line 2—2 of FIG. 1.

A manually operable lever 68 is fixed to the inner end of shaft 66 and extends upwardly in the vicinity of the left-hand corner of the instrument panel 69 of the body (FIG. 2). The lever 68 is provided for opening and closing the door from the body interior and a door handle 70 is employed for opening the door exteriorly of the body.

In operation, therefore, the door 12 is normally positioned in the lower portion of the vehicle body opening 11 by means of bell-crank lever 49 and its connections with the keeper 52 and the spring loaded extensible arm 63. In this position, the door is supported upon the guides by universal rollers 26 each positioned as illustrated in FIG. 5 in the right-hand portions of their respective guides. The quick acting window mechanism will be in the position illustrated in FIG. 5, whilst the lazy-tongs lift 75 for the window might be extended in any selected or desired position between its fully closed position for the window 40 indicated in full lines in said figure or its fully lowered position indicated in dotted lines therein. When it is desired to open the door the control lever 68 is manually rotated in a clockwise direction as illustrated in FIG. 1 and the spring loaded extensible arm 63 will be rotated in a similar direction to cause counterrotation of the bell-crank lever 49 from a position illustrated in FIG. 6 to its position assumed in FIG. 7. Initial rotation of the bell-crank lever rotates its arm 56 into camming engagement with the vehicle body thereby moving the adjacent side of the door inwardly to the position illustrated in FIG. 7, where said arm engages against a stop 560 fixed on the door extension 51 thus arresting rotation of the bell crank lever so that the door may be moved into the compartment 16 on its guides under the control of the extensible arm 63. As has been stated initial movement of the bell-crank lever will cause the lever 57 to quickly move the lazy-tongs lift 75 to its full window lowered position within the door before the door is moved by the arm 63 to its dotted line, open position within the compartment (FIG. 5). To close the door it is only necessary to manually rotate the lever 68 in a counterclockwise direction which results in movement of the lever 49 to a position illustrated in FIG. 6 where it again is latched behind the keeper 52.

In an emergency, a rotation of one quarter turn or less of shaft 77 in FIG. 4a moves attached lever 76 away from spring 33 thereby releasing door 15 from body 10 by manual operation of release lever 78. During a collision the door is pushed against lever 76 where a perforated or otherwise weakened portion surrounding the contact spot of lever 76 gives way and the swinging of the door post hinged panel 330 away from door 12 releases the door holding mechanism and in conjunction with the extensible arm jettisons the entire door.

I claim:

1. In a closed vehicle body having a vertically elongated opening for entrance and exit, the combination of:
    (a) a vertically foreshortened recess formed within the confines of the body and disposed therein in communication with the lower part of the opening;
    (b) a door structure normally adapted to close the opening and including an upper section having a portion thereof normally extending above the level of the recess and a lower section disposed to one side of said recess and beneath the upper section;
    (c) actuating means carried by the lower section and operatively connected to the upper section for collapsing the upper section into the lower section;
    (d) spring loaded control means mounted on the vehicle body for sliding the collapsed door selectively into and out of the recess;
    (e) means providing an operative connection between the control means and the actuating means for initially lowering the upper section into the lower section before moving the collapsed door into the recess; and
    (f) jettisoning means between the rear vertical edge of said door and the vehicle body co-operating with said spring loaded control means enabling the said door to be jettisoned from the vehicle.

2. In a closed vehicle body having a vertically elongated opening for entrance and exit, the combination as claimed in claim 1 wherein the means for jettisoning said door comprises:
    (a) an angular rear door post separating the exterior and interior walls of said vehicle body and having an opening near its center;
    (b) an angular rear edge member on said door mating with said angular door post, said angular interface forming a plane that is to the rear and away from said aircraft body;
    (c) a spring loaded hinge means positioned to protrude through said door post opening when released from a coacting retaining means; and
    (d) a short rod fitted on the rear angular edge of said door and being received by a vertical groove on the angular face of said rear door post, said groove forming alignment means for the closing of said door.

3. In a closed vehicle body having a vertically elongated opening for entrance and exit, the combination as claimed in claim 2 wherein the retaining means for said spring loaded hinge comprises:
    (a) a lever on the interior of said vehicle mounted on a rotatable spindle extending into the interior of said door;
    (b) an L-shaped member between the vehicle walls secured to said spindle, said L-shaped member connected to a retaining bar through frangible connecting means, said retaining bar engaging said spring loaded hinge holding it in a cocked position ready to be released through the opening in said door post and force said door to jettison by pushing said door away from said vehicle.

4. In a closed vehicle body having a vertically elongated opening for entrance and exit, the combination as claimed in claim 1 wherein the actuating means carried by the lower section is comprised of:
    (a) a slotted bar along the bottom edge of said upper section of said door;
    (b) a lazy tong mechanism having its lower end secured to said lower section of said door, and its upper end slidably mounted within said slotter bar; and
    (c) a horizontally movable bar attached to one of the lower arms of said lazy tong mechanism, said bar being operatively connected to said control means for sliding said door into or out of said recess.

5. In a closed vehicle body having a vertically elongated opening for entrance and exit, the combination as claimed in claim 1 wherein the means for jettisoning said door comprises:
    (a) an angular rear door post separating the exterior and interior walls of said vehicle body, said door post having an opening near its center;
    (b) an angular rear edge member on said door abutting said angular door post;
    (c) a spring loaded hinge means positioned to protrude through said opening in said door post when released from its retaining means;
    (d) frangible retaining means between said spring hinge and said door post to normally hold said spring in a cocked position ready to be released through the opening in within said door post; and
    (e) aligning means between said door and said rear door post for aligning said door with said post.

6. In a closed vehicle body having a vertically elongated opening for entrance and exit, the combination as claimed in claim 1 including operating means for manually raising and lowering said upper section of said door while said door is in its closed position.

7. In a closed vehicle body having a vertically elongated opening for entrance and exit, the combination as claimed in claim 6 wherein the means for manually raising and lowering said upper section of said door comprises:
    (a) a hand operated window crank means within said door;
    (b) a lazy tong mechanism connected between the lower portion of said door and upper section of said door; and
    (c) spring means connecting said crank means to said lazy tong mechanism in such a manner that rotation of said window crank means will raise and lower said lazy tong mechanism and thereby raise and lower said upper section of said door.

References Cited by the Examiner

UNITED STATES PATENTS

| | | | |
|---|---|---|---|
| 2,038,035 | 4/36 | Friedrich | 268—127 |
| 2,509,362 | 5/50 | Miller | 296—44 |
| 2,658,792 | 11/53 | Scott | 296—47.1 |
| 2,830,843 | 4/58 | Seaburg | 296—44 |
| 3,086,810 | 4/63 | Yuen | 296—44.01 |

B. HERSH, *Primary Examiner.*

A. HARRY LEVY, *Examiner.*